United States Patent
Sato et al.

(10) Patent No.: US 6,515,099 B2
(45) Date of Patent: Feb. 4, 2003

(54) SHAPED ARTICLE OF POLYAMIDE RESIN AND PRODUCTION THEREOF

(75) Inventors: Kazunobu Sato, Kanagawa (JP); Koji Yamamoto, Kanagawa (JP); Kazunobu Maruo, Saitama (JP); Satoshi Okada, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/859,539

(22) Filed: May 18, 2001

(65) Prior Publication Data

US 2001/0056148 A1 Dec. 27, 2001

(30) Foreign Application Priority Data

May 19, 2000 (JP) ......................... 2000-147929

(51) Int. Cl.⁷ ............................. B32B 27/00; C08F 6/00; C08L 77/00; C08K 3/22; C08K 3/34
(52) U.S. Cl. ........................ 528/310; 528/480; 528/490; 528/502 R; 528/502 B; 428/34.1; 428/34.7; 428/221; 428/331; 428/324; 428/332; 428/338; 428/339; 428/411.1; 428/474.4; 524/442; 524/445; 524/447; 524/448; 524/449; 524/451; 524/789; 524/879; 264/176.1; 264/209.1
(58) Field of Search ................. 428/474.4, 221, 428/331, 324, 332, 338, 339, 411.1, 34.1, 34.7; 524/879, 789, 442, 445, 447–449, 451; 264/176.1, 209.1; 528/480, 490, 502 R, 502 B, 310

(56) References Cited

U.S. PATENT DOCUMENTS

| | | | | |
|---|---|---|---|---|
| 4,739,007 A | * | 4/1988 | Okada et al. | 524/789 |
| 4,810,734 A | * | 3/1989 | Kawasumi et al. | 523/216 |
| 4,894,411 A | * | 1/1990 | Okada et al. | 524/710 |
| 5,102,948 A | | 4/1992 | Deguchi et al. | |
| 5,268,219 A | * | 12/1993 | Harada et al. | 428/220 |
| 6,156,838 A | * | 12/2000 | Yoshikawa et al. | 524/789 |
| 6,166,171 A | * | 12/2000 | Yamamoto et al. | 528/310 |
| 6,255,378 B1 | * | 7/2001 | Fujimoto et al. | 524/449 |
| 6,384,121 B1 | * | 5/2002 | Barbee et al. | 524/445 |
| 6,417,262 B1 | * | 7/2002 | Turner et al. | 524/445 |

FOREIGN PATENT DOCUMENTS

| | | |
|---|---|---|
| JP | 2-69562 | 3/1990 |
| JP | 2-105856 | 4/1990 |
| JP | 0398551 | 11/1990 |
| JP | 2-305828 | 12/1990 |
| WO | 00/09605 | 2/2000 |

* cited by examiner

*Primary Examiner*—P. Hampton-Hightower
(74) *Attorney, Agent, or Firm*—Antonelli, Terry, Stout & Kraus, LLP

(57) ABSTRACT

The polyamide resin shaped article of the present invention is produced by preliminarily melt-kneading a m-xylylene-containing polyamide resin and a layered silicate subjected to a swelling treatment to prepare a resin composition containing the layered silicate in high concentration, melt-kneading the resin composition with another portion of m-xylylene-containing polyamide resin, and then formed into the shaped article. Since the amount of the m-xylylene-containing polyamide resin exposed to the heat history twice in the melt-kneading steps is minimized, the gel formation due to the thermal degradation can be reduced and the lowering of the relative viscosity due to the decrease of the molecular weight caused by the thermal degradation of the m-xylylene-containing polyamide resin is prevented.

18 Claims, No Drawings

SHAPED ARTICLE OF POLYAMIDE RESIN AND PRODUCTION THEREOF

BACKGROUND OF THE INVENTION

1. Field of the Invention

The present invention relates to a polyamide resin shaped article excellent in clarity, appearance, gas barrier properties, mechanical properties, and moldability which are required in packaging materials for foods, beverages, medicines, electric parts, etc. The present invention further relates to a method for producing such a polyamide resin shaped article.

2. Description of the Prior Art

Polyamide resin has been widely used as the material for injection molding automotive parts, electric parts, electronic parts, etc., because of its excellent mechanical properties. Its application field extends to packaging materials for foods, beverages, medicines, electric parts, etc. Of various polyamide resins, a m-xylylene group-containing polyamide prepared by the polycondensation of m-xylylenediamine and an aliphatic dicarboxylic acid (hereinafter may be referred to as "MX nylon"), particularly polyamide MXD6 prepared from m-xylylenediamine and acidic acid is utilized as a gas-barrier material for manufacturing a shaped article such as film and bottle because of its low permeability against gaseous substance such as oxygen and carbon dioxide. Recently, there is an increasing demand for a gas-barrier package capable of storing foods, beverages, etc. for a long term without detracting their freshness. This in turn increases the demand for improvement of the gas-barrier properties much more.

As the method for improving the gas-barrier properties of polyamide resin, Japanese Patent Application Laid-Open Nos. 2-69562, 2-105856 and 2-305828 disclose to incorporate a layered silicate into a polyamide resin. The incorporation can be effected, for example, by melt-kneading the layered silicate and a polyamide in a known various types of extruders such as single or twin screw extruder and extruding the kneaded product, or by producing polyamide by melt polymerization in the presence of the layered silicate.

In the incorporation by the melt kneading, the whole part of polyamide which constitutes the final material for producing shaped article is melted and kneaded with the layered silicate in an extruder, extruded from the extruder, cooled for solidifying, and formed into pellets. The pellets thus prepared are made flowable again by heating in T-die extruder, injection molding machine, etc. to produce final shaped articles such as film. Therefore, the whole part of polyamide to constitute shaped articles is subject to heat history at least twice. As a result, as compared with the incorporation of the layered silicate during the production of polyamide by melt polymerization, the polyamide is cross-linked much more to result in the formation of a large amount of gel-like substances in the final shaped articles such as film, thereby spoiling the fine appearance of the shaped articles and causing frequent breaking and rupture during the production of the shaped articles such as film to reduce the industrial and commercial values.

Particularly, because of a higher melting point and a low heat stability in molten state as compared with nylon 6, the m-xylylene group-containing polyamide is liable to arise various problems such as deterioration in clarity and appearance, breaking during the shaping or molding process, etc. by the thermal decomposition and gel formation when subjected to heat history during the extrusion, etc. Since the lowering of the molecular weight by the thermal decomposition reduces the relative viscosity of the polyamide, films and sheets extruded from a T-die or circular die extruder are uneven in their thickness, and multi-layer preforms produced by injection molding has a core layer (center layer) with non-uniform section, thereby spoiling the appearance and reducing the barrier properties.

Generally, the layered silicate is finely and uniformly dispersed into nylon 6 by conducting the polycondensation for producing nylon 6 in the presence of the layered silicate. However, from the experience of the inventors, this method fails to produce a m-xylylene group-containing polyamide having a high molecular weight.

As described above, the attempt to disperse the layered silicate into the m-xylylene group-containing polyamide by the method conventionally applied to nylon 6, etc. arises technical problems which are inherent in the m-xylylene group-containing polyamide but not encountered in nylon 6, etc. However, the prior art has not ever considered such specific problems.

SUMMARY OF THE INVENTION

An object of the present invention is to provide a polyamide resin shaped article comprising a m-xylylene group-containing polyamide resin, in which a layered silicate treated with an organic swelling agent are uniformly dispersed throughout the resin. Another object of the present invention is to provide a polyamide resin shaped article which is excellent in the properties required for packaging materials such as clarity, appearance, gas-barrier properties, mechanical strength and moldability and contains less gel-like substance. Still another object of the present invention is to provide a production method of a polyamide resin shaped article without lowering the molecular weight of the m-xylylene group-containing polyamide during the incorporating operation of the layered silicate.

As a result of extensive study in view of attaining the above objects, the inventors have found that the problems can be solved by preliminarily melt-kneading the m-xylylene group-containing polyamide resin and the layered silicate in a specific ratio under specific conditions to prepare a master batch, and melt-kneading the master batch with the m-xylylene group-containing polyamide resin in a specific ratio when producing the shaped articles.

Thus, the present invention provides a polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-chain, aliphatic $\alpha$, $\omega$-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, wherein the polyamide resin shaped article is produced by preliminarily melt-kneading 70 to 95 mass % of the polyamide resin A and 30 to 5 mass % of the silicate B, on the basis of a sum of the polyamide resin A and the silicate B, to prepare a resin composition C; melt-kneading 3 to 40 mass % of the resin composition C and 97 to 60 mass % of the polyamide resin A, on the basis of a sum of the resin composition C and the polyamide resin A, at the time of producing the polyamide resin shaped article; and then shaping or molding the melt-kneaded product into the polyamide resin shaped article in which the silicate B is uniformly and finely dispersed throughout the polyamide resin A.

The present invention further provides a method for producing a polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-chain, aliphatic α, ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, the method comprising: preliminarily melt-kneading 70 to 95 mass % of the polyamide resin A and 30 to 5 mass % of the silicate B, on the basis of a sum of the polyamide resin A and the silicate B, at 250 to 300° C. for a residence time of five minutes or shorter, thereby preparing a resin composition C; melt-kneading 3 to 40 mass % of the resin composition C and 97 to 60 mass % of the polyamide resin A, on the basis of a sum of the resin composition C and the polyamide resin A, at 245 to 290° C. for a residence time of 20 minutes or shorter at the time of producing the polyamide resin shaped article; and then shaping or molding the melt-kneaded product into the polyamide resin shaped article in which the silicate B is uniformly and finely dispersed throughout the polyamide resin A.

DETAILED DESCRIPTION OF THE INVENTION

The polyamide resin A used in the present invention is a m-xylylene group-containing polyamide produced by the polycondensation of a diamine component comprising 70 mol % or more of m-xylylenediamine and a dicarboxylic acid component comprising 70 mol % or more of a straight-chain, aliphatic α, ω-dicarboxylic acid having 4 to 12 carbon atoms. With the use of such a polyamide, the final shaped article such as film, sheet and hollow container exhibits excellent properties such as the gas-barrier properties against oxygen, carbon dioxide, etc.

Of the above polyamides, polyamide MXD6 produced by the polycondensation of m-xylylenediamine and adipic acid is particularly preferable because of its high gas-barrier properties against oxygen, carbon dioxide, etc.

Examples of diamines other than m-xylylenediamine include an aliphatic diamine such as tetramethylenediamine, pentamethylenediamine, hexamethylenediamine, octamethylenediamine, and nonamethylenediamine; an aromatic diamine such as p-phenylenediamine, o-xylylenediamine and p-xylylenediamine; and an alicyclic diamine such as bis(aminomethyl)cyclohexane.

Examples of the straight-chain, aliphatic α, ω-dicarboxylic acid having 4 to 12 carbon atoms include succinic acid, glutaric acid, pimelic acid, suberic acid, azelaic acid, adipic acid, sebacic acid, undecanedioic acid, and dodecanedioic acid. Of these dicarboxylic acids, preferred is adipic acid.

In addition to the above straight-chain, aliphatic α, ω-dicarboxylic acid, an aromatic dicarboxylic acid such as terephthalic acid, isophthalic acid and 2,6-naphthalenedicarboxylic acid can be used as the dicarboxylic acid component.

The polyamide resin A can be produced by any known methods and under any known polymerization conditions without any specific limitation.

The relative viscosity of the polyamide resin A is 2.45 to 3.85, preferably 2.50 to 3.70, and more preferably 2.55 to 3.65 when measured at 25° C. on a 1 g/dl solution in a 96% aqueous sulfuric acid. When the relative viscosity is lower than 2.45, the resultant shaped articles suffer from defects such as uneven thickness and non-uniform section. A polyamide having a relative viscosity higher than 3.85 is difficult to produce because of the production limitation. By regulating the relative viscosity within the range of 2.45 to 3.85, the dispersibility of the silicate B is enhanced because the resins are subject to moderate pressure during the kneading and extruding operations, and the regulation of the width of films and sheets become easy because the neck-in occurs scarcely when extruded from a T-die extruder.

The layered silicate for preparing the silicate B includes a 1:1 type layered silicate structured by one tetrahedral layer per one octahedral layer and a 2:1 type layered silicate structured by two tetrahedral layers per one octahedral layer. The 1:1 type layered silicate may include kaolinite, halloysite, chrysotile, etc. The 2:1 type layered silicate may include a smectite mineral such as montmorillonite, hectorite, beidellite, and saponite; a mica mineral such as muscovite and phlogopite; talc; pyrophyllite; vermiculite; and chlorite. Preferred are montmorillonite, mica and vermiculite, and more preferred is montmorillonite.

The silicate B is prepared by contacting the layered silicate with an organic swelling agent of polymer type or organic compound type to increase the interlayer distance of the layered silicate.

Examples of the organic swelling agent include a quaternary ammonium salt and an ω-amino acid. Preferred is a quaternary ammonium salt having at least one alkyl or alkenyl group having 12 or more carbon atoms.

Specific examples of the organic swelling agent include a trimethylalkylammonium salt such as trimethyldodecylammonium salt, trimethyltetradecylammonium salt, trimethylhexadecylammonium salt, trimethyloctadecylammonium salt, and trimethyleicosylammonium salt; a trimethylalkenylammonium salt such as trimethyloctadecenylammonium salt and trimethyloctadecadienylammonium salt; a triethylalkylammonium salt such as triethyldodecylammonium salt, triethyltetradecylammonium salt, triethylhexadecylammonium salt, and triethyloctadecylammonium salt; a tributylalkylammonium salt such as tributyldodecylammonium salt, tributyltetradecylammonium salt, tributylhexadecylammonium salt, and tributyloctadecylammonium salt; a dimethyldialkylammonium salt such as dimethyldidodecylammonium salt, dimethylditetradecylammonium salt, dimethyldihexadecylammonium salt, dimethyldioctadecylammonium salt, and dimethylditallowammonium salt; a dimethyldialkenylammonium salt such as dimethyldioctadecenylammonium salt and dimethyldioctadecadienylammonium salt; a diethyldialkylammonium salt such as diethyldidodecylammonium salt, diethylditetradecylammonium salt, diethyldihexadecylammonium salt, and diethyldioctadecylammonium salt; a dibutyldialkylammonium salt such as dibutyldidodecylammonium salt, dibutylditetradecylammonium salt, dibutyldihexadecylammonium salt, and dibutyldioctadecylammonium salt; a methylbenzyldialkylammonium salt such as methylbenzyldihexadecylammonium salt; a dibenzyldialkylammonium salt such as dibenzyldihexadecylammonium salt; a trialkylmethylammonium salt such as tridodecylmethylammonium salt, tritetradecylmethylammonium salt, and trioctadecylmethylammonium salt; a trialkylethylammonium salt such as tridodecylethylammonium salt; a trialkylbutylammonium salt such as tridodecylbutylammonium salt; and an ω-amino acid such as 4-amino-n-butylic acid, 6-amino-n-caproic acid, 8-aminocaprylic acid, 10-aminodecanoic acid, 12-aminododecanoic acid, 14-aminotetradecanoic acid, 16-aminohexadecanoic acid, and 18-aminooctadecanoic acid. Of the above, preferred are trimethyldodecylammonium salt, trimethyltetradecylammonium salt, trimethylhexadecylammonium salt, trimethyloctadecylammonium salt, dimethyldidodecylammonium salt, dimethylditetradecylammonium salt, dimethyldihexadecylammonium salt, dimethyldioctadecylammonium salt, and dimethylditallowammonium salt. These organic swelling agents may be used alone or in combination of two or more.

The amount of the organic swelling agent to be used in the contact treatment of the layered silicate to increase the interlayer distance is 20 to 50 mass %, preferably 25 to 45 mass % based on the amount of the silicate B. With the use of the organic swelling agent in such an amount, the interlayer distance of the layered silicate increases moderately to ensure the uniform dispersion of the layered silicate into the polyamide resin. The swelling treatment may be carried out by a known method without any specific limitation.

The content of the silicate B in the polyamide resin shaped article is preferably 0.3 to 8 mass %, and more preferably 0.5 to 5 mass %. The improvement in the gas-barrier properties can be obtained in a content of 0.3 mass % or higher. The clarity of the shaped article is not lowered when the content is 8 mass % or lower. The addition of the silicate B exceeding 8 mass % produces no additional improvement in the gas-barrier properties.

In the production of the shaped article of the present invention, the polyamide resin A and the silicate B are preliminarily melt-kneaded to prepare the resin composition C as a master batch. The mixing ratio, the polyamide resin A to the silicate B, is 70–95 mass % to 30–5 mass %, preferably 80–93 mass % to 20–7 mass %, more preferably 85–90 mass % to 15–10 mass %. The ratio is selected from the above range so that the combined mass percentages of the polyamide resin A and the silicate B total 100 mass percent.

To reduce the amount of the polyamide resin A which is exposed to both the heat history at the production of the resin composition C (first melt-kneading step) and the heat history at the production of the shaped article (second melt-kneading step), it is advisable to minimize the amount of the polyamide resin A in the resin composition C. However, if the amount of the polyamide resin is less than 70 mass %, the silicate B is not well kneaded with the polyamide resin A to result in uneven dispersion of the silicate B. An amount of the polyamide resin A exceeding 95 mass % excessively increases the amount of the polyamide resin A which is exposed to the heat history twice, thereby forming gel much more to reduce the effect of the present invention.

The silicate B should be uniformly dispersed throughout the polyamide resin A without locally condensed. The words "uniform dispersion" including its modified form means that the layered silicate is separated into flat layers in the polyamide resin and 50% or more of the separated layers have a interlayer distance of 50 Å or more. The interlayer distance means the distance between the gravity centers of adjacent pair of the separated flat layers. The larger the interlayer distance, the layered silicate is dispersed more uniformly to provide s final film, sheet or hollow container which has a good appearance such as a high clarity and enhanced gas-barrier properties against oxygen, carbon dioxide, etc.

The incorporation of the silicate B to the polyamide resin A is generally performed by conducting the melt polymerization for producing the polyamide resin in the presence of the silicate B under stirring, or by melt-kneading the polyamide resin A and the silicate B in various usual extruders such as a single or twin screw extruder. The melt kneading in a twin screw extruder is preferable in view of the productivity, its general use, etc.

The melt kneading is carried out at 250 to 300° C. for a residence time of 5 minutes or shorter. The screw is preferred to have at least one reverse screw element and/or at least one kneading disc to allow a portion of the melt to dwell there. If the melt-kneading temperature is lower than 250° C., the dispersibility of the layered silicate becomes poor. Since the polyamide becomes liable to undergo a thermal decomposition to reduce its molecular weight or form gel, the melt-kneading temperature higher than 300° C. and the residence time longer than 5 minutes are undesirable. By providing the screw with a dwelling portion, the dispersibility of the layered silicate can be improved. In view of the dispersibility and prevention of the thermal decomposition and the gel formation, it is particularly preferable to regulate the melt-kneading time within one to five minutes.

In the present invention, the incorporation of the silicate B is conducted by preliminarily melt-kneading 70 to 95 mass % of the polyamide resin A and 30 to 5 mass % of the silicate B to prepare the resin composition C, i.e., master batch, containing the layered silicate in high concentration, as described above. Then 3 to 40 mass % of the resin composition C is melt-kneaded with 97 to 60 mass % of the polyamide resin A, each mass percentage being based on the total amount of the resin composition C and the polyamide resin A, to make the final concentration of the silicate B in the polyamide resin shaped article into 0.3 to 8 mass % based on the total amount of the polyamide resin A and the silicate B. Preferably, 5 to 30 mass % of the resin composition C and 95 to 70 mass % of the polyamide resin A are melt-kneaded to make the final concentration of the silicate B in the polyamide resin shaped article into 0.5 to 5 mass %.

If the amount of the resin composition C is less than 3 mass %, the improvement of the gas-barrier properties becomes insufficient because of a low content of the silicate B in the polyamide resin shaped article. An amount of the resin composition C larger than 40 mass % is likely to cause the gel formation because an increased amount of the polyamide resin is exposed to the heat history.

The melt kneading of the resin composition C and the polyamide resin A and the shaping or molding of the kneaded melt into the shaped article is preferably conducted by a molding machine combined with a single or twin screw extruder. The melt-kneading temperature is 245 to 290° C., and the residence time is preferably 20 minutes or shorter. If the melt-kneading temperature is lower than 245° C., a part of the resin may remain unmelted. If higher than 290° C. or the residence time is longer than 20 minutes, the polyamide unfavorably becomes liable to undergo a thermal decomposition, thereby reducing its molecular weight or forming gel. By providing the screw with a dwelling portion, the dispersibility of the layered silicate can be improved. To assure a sufficient melt kneading and prevent the thermal degradation and the gel formation, it is particularly preferable to regulate the melt-kneading time within 3 to 20 minutes.

It is preferred to dry-blend the polyamide resin A to the resin composition C prior to the melt-kneading step. Thereafter, the resultant blend is fed into a T-die extruder, an injection molding machine, etc. to produce a shaped article in which the silicate B is uniformly dispersed throughout the polyamide resin A without locally concentrated.

Since the resin composition C preliminarily prepared is added with the polyamide resin A by a dry-blending method, the production method of the polyamide resin shaped article of the present invention can reduce the amount of the polyamide resin which is exposed to the heat history twice during the melt-kneading steps as compared with the conventional method which directly gives the polyamide composite material by melt-kneading the whole part of the polyamide and the layered silicate, i.e., a melt-blending method. Therefore, the production method of the present invention not only gives a shaped article such as film which has a high oxygen-barrier property and a good appearance and contains less amount of the gel-like substance formed by the thermal degradation, but also prevents the lowering of the relative viscosity due to the decrease of the molecular weight caused by the thermal degradation of the polyamide resin A.

The relative viscosity of the shaped article such as film and sheet of the present invention, which is measured at 25° C. on a 1 g/dl solution in 96% aqueous sulfuric acid, is preferably 2.45 to 3.85, and more preferably 2.50 to 3.80. If less than 2.45, the resultant shaped article suffers from uneven thickness and non-uniform section. Generally, it is difficult to produce a shaped article having a relative viscosity larger than 3.85 because of the production limitation. Even if it were to be produced, the gel formation due to the thermal degradation becomes significant because a high pressure and a high temperature are required during the extrusion operation. By regulating the relative viscosity within the above range of 2.45 to 3.85, the uneven thickness and non-uniform section can be avoided and the good moldability can be maintained.

By employing the production method of the present invention, the number of the gel-like particles having a diameter of 50 $\mu$m or more can be easily reduced as low as 1500 particles or less per $3\times10^{-4}$ m$^3$ of the shaped article. The number of the gel-like particles was measured by visually counting the gel-like particles having a diameter of 50 $\mu$m or more present in the area of 100×100 mm of a non-stretched film.

Thus, the production method of the present invention dose not spoil the appearance of film, etc., and hardly causes the breaking or rupture in the production of film, etc. In addition, with its little uneven thickness and non-uniform section, the shaped article produced by the production method of the present invention has great industrial and commercial values.

The oxygen permeability of the shaped article such as film and sheet produced by the production method of the present invention is preferably 0.65 ml·mm/m$^2$·day·MPa or less when measured at 23° C. and 60% relative humidity. Thus, being excellent in the oxygen-barrier properties, the polyamide resin shaped article of the present invention is suitable as the packaging materials which are required to have high oxygen-barrier properties.

The polyamide resin shaped article of the present invention useful as the packaging material for foods, beverages, medicines, electric parts, etc., may be in the form of non-stretched film, stretched film, multilayer film, multilayer stretched film, sheet, multilayer sheet, paper-laminated body, or multilayer hollow container such as bottle, cup, tray and tank. Although not specifically limited, these shaped articles are preferably produced by a melt molding method such as a T-die extrusion and a blow molding. For example, a non-stretched film or sheet may be produced by using a T-die extruder. The non-stretched sheet or film is stretched in the machine direction and/or the transverse direction to produce a stretched film, or deep-drawn into cups, trays, etc. Bottles, tanks can be produced by blow-molding a tubular parison which is formed using an injection molding machine or an extruder.

The polyamide resin shaped article of the present invention may contain another resin such as nylon 6, nylon 66, nylon 6,66, polyester and olefin as far as the object of the present invention is not lost. In addition, the polyamide resin shaped article of the present invention may further contain an additive. Examples of such an additive include an inorganic filler such as glass fiber and carbon fiber; a flat inorganic filler such as glass flake, talc, kaolin and mica; an impact modifier such as elastomers; a nucleating agent; a lubricant such as amides of fatty acids and metal salts of fatty acids; an antioxidant such as copper compounds, organic or inorganic halogen compounds, hindered phenols, hindered amines, hydrazines, sulfur compounds, and phosphorus compounds; a heat stabilizer; an anti-coloring agent; an ultraviolet absorber; a releasing agent; a plasticizer; a coloring agent; and a fire retardant.

The present invention will be described more in detail by reference to the following examples, which are not intended to restrict the scope of the present invention thereto. In the following examples, the polyamide shaped articles were evaluated by the following methods.

1. Relative Viscosity of Polyamide Resin

Measured at 25° C. on a 1 g/dl solution of polyamide in 96% aqueous sulfuric acid using Cannon-Fenske viscometer.

2. Number of Gel-like Particles

The number of gel-like particles with 50 $\mu$m or more diameter present in the area of 100×100 mm of a non-stretched film was counted.

3. Dispersibility of Layered Silicate From a non-stretched film, a thin piece of 0.1 $\mu$m thick was cut out using a microtome to take a photomicrograph (×100,000) showing the dispersed flat layers of layered silicate using JEM-1200EX2 transmission electron microscope manufactured by Nippon Denshi Co., Ltd. The distance between gravity centers of adjacent flat layers was scaled on 20 photomicrographs to determine the percentage of the flat layers having a distance of 50 Å or more on the total flat layers.

4. Clarity

Using ZE-2000 manufactured by Nippon Denshoku Kogyo Co., Ltd., the haze of a non-stretched film was measured according to ASTM D 1003.

5. Oxygen Permeability

Using OX-TRAN 10/50A manufactured by Modern Control Co., Ltd., the oxygen permeability of a non-stretched film was measured according to ASTM D3985 at 23° C. and 60% relative humidity.

6. Standard Deviation of Film Thickness

The thickness of a non-stretched film was measured at 20 positions taken along the machine direction with 50 cm intervals and 5 cm inside the edge. The standard deviation was calculated from the measured values.

7. Intrinsic viscosity [η] of poly(ethylene terephthalate)

Measured in a mixed solvent of phenol/tetrachloroethane=6/4 (by weight) at 30° C.

8. Oxygen Permeability of Bottle

Measured according to ASTM D3985 using OX-TRAN 10/50A manufactured by Modern Control Co., Ltd. at 23° C. under 100% relative humidity inside the test bottle and 50% relative humidity of the surrounding atmosphere.

EXAMPLE 1

After dry-blending 90 parts by mass of polyamide MXD6 and 10 parts by mass of a swelled layered silicate, the resultant blend was fed into a twin screw extruder having a 37 mm cylinder and a dwelling portion made by a reverse element through a metering feeder at a rate of 15 kg/hr.

Polyamide MXD6

MX NYLON 6007, trade name, available from Mitsubishi Gas Chemical Company, Inc. (referred to as "NMXD6" in Tables)

Relative viscosity: 2.7

Swelled layered silicate

ORBEN (trade name) available from Shiraishi Kogyo Co., Ltd.

Montmorillonite treated with a trimethyloctadecylammonium salt as the organic swelling agent.

Content of organic swelling agent: 34 mass %

After melt-kneading under conditions of 270° C. cylinder temperature, 100 rpm screw rotation and one-minute residence time, the kneaded melt was extruded into a molten strand, which was then solidified by cooling air and pelletized.

After dry-blending 10 parts by mass of the pellets and 90 parts by mass of polyamide MXD6 (MX NYLON 6007), the resultant blend was fed to a T-die twin screw extruder of 20-mm cylinder through a metering feeder at a rate of 1.2 kg/hr. After melt-kneading under conditions of 270° C. cylinder temperature, 100-rpm screw rotation and two-minute residence time, the kneaded melt was extruded through the T-die into film form which was solidified on a cooling roll of 70° C. while taken off at a rate of 2.7 m/min to obtain a non-stretched film of 50 µm thick. The evaluation results of the non-stretched film are shown in Table 1.

EXAMPLES 2 TO 4

The same procedures as in Example 1 were repeated except for changing the addition amount of the silicate B for preparing the resin composition C and the mixing ratio of the resin composition C and the polyamide resin A. The evaluation results of the non-stretched film are shown in Table 1.

Comparative Example 1

After dry-blending 90 parts by mass of polyamide 6 (UBE 1024B, trade name, available from Ube Industries, Ltd.) having a relative viscosity of 3.5 and 10 parts by mass of swelled montmorillonite (ORBEN), the resultant blend was fed into a twin screw extruder having a 37-mm cylinder and a dwelling portion made by a reverse element through a metering feeder at a rate of 15 kg/hr. After melt-kneading under conditions of 260° C. cylinder temperature, 100-rpm screw rotation and one-minute residence time, the kneaded melt was extruded into a molten strand, which was then solidified by cooling air and pelletized.

After dry-blending 20 parts by mass of the pellets and 80 parts by mass of polyamide 6 (UBE 1024B), the resultant blend was fed to a T-die twin screw extruder of 20-mm cylinder through a metering feeder at a rate of 1.2 kg/hr. After melt-kneading under conditions of 260° C. cylinder temperature, 100-rpm screw rotation and two-minute residence time, the kneaded melt was extruded through the T-die into film form which was solidified on a cooling roll of 40° C. while taken off at a rate of 2.7 m/min to obtain a non-stretched film of 50 µm thick. The evaluation results of the non-stretched film are shown in Table 1.

Comparative Example 2

After dry-blending 98 parts by mass of polyamide 6 (UBE1024B) and 2 parts by mass of swelled montmorillonite (ORBEN), the resultant blend was fed into a twin screw extruder having a 37-mm cylinder and a dwelling portion made by a reverse element through a metering feeder at a rate of 15 kg/hr. After melt-kneading under conditions of 260° C. cylinder temperature, 100-rpm screw rotation and one-minute residence time, the kneaded melt was extruded into a molten strand, which was then solidified by cooling air and pelletized.

The pellets thus prepared were fed to a T-die twin screw extruder of 20-mm cylinder through a metering feeder at a rate of 1.2 kg/hr. After melt-kneading under conditions of 260° C. cylinder temperature, 100-rpm screw rotation and two-minute residence time, the kneaded melt was extruded through the T-die into film form which was solidified on a cooling roll of 40° C. while taken off at a rate of 2.7 m/min to obtain a non-stretched film of 50 µm thick. The evaluation results of the non-stretched film are shown in Table 1.

Comparative Example 3

The same procedures as in Comparative Example 2 were repeated except for preparing the resin composition C using polyamide MXD6 (MX NYLON 6007) instead of polyamide 6 (UBE1024B) in a different blending amount of the silicate B at a cylinder temperature of 270° C. The evaluation results of the non-stretched film are shown in Table 1.

Comparative Example 4

Polyamide MXD6 (MX NYLON 6007) was fed to a T-die twin screw extruder of 20-mm cylinder through a metering feeder at a rate of 1.2 kg/hr. After melt-kneading under conditions of 270° C. cylinder temperature, 100-rpm screw rotation and two-minute residence time, the kneaded melt was extruded through the T-die into film form which was solidified on a cooling roll of 70° C. while taken off at a rate of 2.7 m/min to obtain a non-stretched film of 50 µm thick. The evaluation results of the non-stretched film are shown in Table 1.

Comparative Example 5

Polyamide MXD6 (MX NYLON 6007) was fed to a T-die twin screw extruder of 20-mm cylinder through a metering feeder at a rate of 1.2 kg/hr. After melt-kneading under conditions of 330° C. cylinder temperature, 100-rpm screw rotation and two-minute residence time, the kneaded melt was extruded through the T-die into film form which was solidified on a cooling roll of 70° C. while taken off at a rate of 2.7 m/min to obtain a non-stretched film of 50 µm thick. The evaluation results of the non-stretched film are shown in Table 1.

Comparative Examples 6 to 8

Resin compositions were prepared using different layered silicates in the same manner as in Example 3. The evaluation results of the non-stretched film are shown in Table 1.

TABLE 1

|  | Ex. 1 | Ex. 2 | Ex. 3 | Ex. 4 |
|---|---|---|---|---|
| Resin Composition C | | | | |
| *Polyamide* | | | | |
| kind | NMXD6 | NMXD6 | NMXD6 | NMXD6 |
| blending amount (part by mass) | 90 | 95 | 90 | 80 |
| *Swelled layered silicate* | | | | |
| kind | ORBEN | ORBEN | ORBEN | ORBEN |
| blending amount (part by mass) | 10 | 5 | 10 | 20 |
| Polyamide Resin Shaped Article | | | | |
| *Blending ratio* | | | | |
| Resin composition C (part by mass) | 10 | 6 | 30 | 25 |
| NMXD6 (part by mass) | 90 | 94 | 70 | 75 |
| Composition | | | | |
| *Polyamide* | | | | |
| kind | NMXD6 | NMXD6 | NMXD6 | NMXD6 |
| relative viscosity | 2.7 | 2.7 | 2.7 | 2.7 |
| content (mass %) | 99 | 99.7 | 97 | 95 |
| *Swelled layered silicate* | | | | |
| kind | ORBEN | ORBEN | ORBEN | ORBEN |
| content (mass %) | 1 | 0.3 | 3 | 5 |
| *Evaluation Results* | | | | |
| Gel-like particles (particles per $3 \times 10^{-4}$ m$^3$) | 1300 | 1100 | 1500 | 1400 |
| Dispersibility (%) | 98 | 98 | 95 | 92 |
| Haze (%) | 1.1 | 0.9 | 2.0 | 4.0 |
| Oxygen permeability (ml · mm/m$^2$ · day · MPa) | 0.59 | 0.65 | 0.55 | 0.50 |
| Relative viscosity | 2.6 | 2.6 | 2.5 | 2.5 |
| Standard deviation of thickness | 5 | 5 | 7 | 7 |

|  | Com. Ex. 1 | Com. Ex. 2 | Com. Ex. 3 | Com. Ex. 4 |
|---|---|---|---|---|
| Resin Composition C | | | | |
| *Polyamide* | | | | |
| kind | Polyamide 6 | Polyamide 6 | NMXD6 | — |
| blending amount (part by mass) | 90 | 98 | 99 | — |
| *Swelled layered silicate* | | | | |
| kind | ORBEN | ORBEN | ORBEN | — |
| blending amount (part by mass) | 10 | 2 | 1 | — |
| Polyamide Resin Shaped Article | | | | |
| *Blending ratio* | | | | |
| Resin composition C (part by mass) | 20 | 100 | 100 | — |
| Polyamide 6 (part by mass) | 80 | — | — | — |
| Composition | | | | |
| *Polyamide* | | | | |
| kind | Polyamide 6 | Polyamide 6 | NMXD6 | NMXD6 |
| relative viscosity | 3.5 | 3.5 | 2.7 | 2.7 |
| content (mass %) | 98 | 98 | 99 | 100 |
| *Swelled layered silicate* | | | | |
| kind | ORBEN | ORBEN | ORBEN | — |
| content (mass %) | 2 | 2 | 1 | 0 |
| Extrusion Temperature (° C.) | — | — | — | 270 |

TABLE 1-continued

| | | | | |
|---|---|---|---|---|
| Evaluation Results | | | | |
| Gel-like particles (particles per $3 \times 10^{-4}$ m$^3$) | 600 | 1600 | 2400 | 1000 |
| Dispersibility (%) | 89 | 91 | 98 | — |
| Haze (%) | 0.3 | 0.5 | 1.6 | — |
| Oxygen permeability (ml · mm/m$^2$ · day · MPa) | 4.9 | 4.9 | 0.59 | 0.9 |
| Relative viscosity | — | — | 2.3 | — |
| Standard deviation of thickness | — | — | 10 | — |

| | Com. Ex. 5 | Com. Ex. 6 | Com. Ex. 7 | Com. Ex. 8 |
|---|---|---|---|---|
| Resin Composition C | | | | |
| Polyamide | | | | |
| kind | — | NMXD6 | NMXD6 | NMXD6 |
| blending amount (part by mass) | — | 90 | 90 | 90 |
| Swelled layered silicate | | | | |
| kind | — | a* | b* | c* |
| blending amount (part by mass) | — | 10 | 10 | 10 |
| Polyamide Resin Shaped Article | | | | |
| Blending ratio | | | | |
| Resin composition C (part by mass) | — | 30 | 30 | 30 |
| NMXD6 (part by mass) | — | 70 | 70 | 70 |
| Composition | | | | |
| Polyamide | | | | |
| kind | NMXD6 | NMXD6 | NMXD6 | NMXD6 |
| relative viscosity | 2.7 | 2.7 | 2.7 | 2.7 |
| content (mass %) | 100 | 97 | 97 | 97 |
| Swelled layered silicate | | | | |
| kind | — | a* | b* | c* |
| content (mass %) | 0 | 3 | 3 | 3 |
| Extrusion Temperature (° C.) | 330 | — | — | — |
| Evaluation Results | | | | |
| Gel-like particles (particles per $3 \times 10^{-4}$ m$^3$) | 5000 | — | — | — |
| Haze (%) | — | 35 | 6.4 | 30 |
| Oxygen permeability (ml · mm/m$^2$ · day · MPa) | 0.9 | >10 | 0.8 | 1.2 | a* KUNIPIA F: Montmorillonite not treated with a swelling agent (Kunimine Kogyo Co., Ltd.)
b* SOMASIF: Synthetic mica containing 42 mass % quaternary ammonium salt as the swelling agent (Corp Chemical Co., Ltd.)
c* LUCENTITE SWF: Synthetic smectite not treated with a swelling agent (Corp Chemical Co., Ltd.)

EXAMPLE 5

After dry-blending 90 parts by mass of polyamide MXD6 (MX NYLON 6007) and 10 parts by mass of swelled layered silicate (OBERN), the resultant blend was fed into a twin screw extruder having a 37-mm cylinder and a dwelling portion made by a reverse element through a metering feeder at a rate of 15 kg/hr. After melt-kneading under conditions of 270° C. cylinder temperature, 100-rpm screw rotation and one-minute residence time, the kneaded was extruded into a molten strand, which was then solidified by a cooling air and pelletized.

The pellets (10 parts by mass) thus prepared were dry-blended with 90 parts by mass of polyamide MXD6 (MX NYLON 6007). Using the resultant blend and poly(ethlene terephthalate) (PET; RT543C available from Nippon Unipet Co., Ltd.), a three-layer parison was produced. The amount of the polyamide MXD 6 was 10 mass % of the three-layer parison, and the overall length of the polyamide MXD6 layer in the three-layer parison was 85 mm from the gate portion.

The three-layer parison thus prepared was biaxially blow-molded to obtain a 500-ml bottle. The oxygen permeability of the bottle was 0.004 cc/bottle·day·0.21 atm, the dispersibility of the layered silicate in the polyamide MXD6 was 98%, and the haze was 3.5.

The production of the bottle will be described more specifically. 1. Production of the three-layer parison First, a thermoplastic polyester resin was injected into a mold cavity from a first injection cylinder. Then, from a second injection cylinder, a gas-barrier polyamide resin was injected into the mold cavity together with the thermoplastic polyester resin so as to fill the mold cavity, thereby producing a three-layer parison. The temperature conditions employed were 270° C. for the first injection cylinder, 260° C. for the second injection cylinder, 270° C. for the resin flow path in the mold, and 15° C. for the mold cooling water. The parison thus produced was 100 mm in the overall length, 23.5 mmφ in the outer diameter, and 4.5 mm in the wall thickness, having a barrel of PET/polyamide MXD6/PET/layer structure.

2. Biaxial Blow Molding the parison was preheated to 100° C. and then biaxially blow molded at a blow pressure of 30 kgf/cm² into a 500 ml multilayer container having an overall length of 223 mm and an outer diameter of 65 mmφ.

Comparative Example 9

Using polyamide MXD6 (MX NYLON 6007) and poly (ethylene terephthalate) (RT543C), a three layer parison was produced. The amount of the polyamide MSD6 was 10 mass % of the three layer parison, and the overall length of the polyamide MXD6 layer in the three layer parison was 85 mm from the gate portion.

The three layer parison thus prepared was biaxially blow molded to obtain a 500-ml bottle having an oxygen permeability of 0.008 cc/bottle·day·021 atm and a haze of 2.6%.

Comparative Example 10

After dry-blending 85 parts by mass of polyamide MXD6 (MX NYLON 6007) and 15 parts by mass of swelled montmorillonite (ORBEN), the resultant blend was fed into a twin screw extruder having a 37-mm cylinder through a metering feeder at a rate of 15 kg/hr. After melt-kneading under conditions of 270° C. cylinder temperature and 100-rpm screw rotation, the kneaded melt was extruded into a molten strand, which was then solidified by a cooling air and pelletized.

Using the pellets thus prepared and poly(ethylene terephthalate) (RT543C), a three-layer parison was produced. The amount of the polyamide MXD6 was 10 mass % of the three-layer parison, and the overall length of the polyamide MXD6 layer in the three-layer parison was 85 mm from the gate portion.

The three-layer parison thus prepared was biaxially blow-molded to obtain a 500-ml bottle having an oxygen permeability of 0.002 cc/bottle·day·0.21 atm and a haze of 18.9%. The dispersibility of the layered silicate in polyamide MXD6 was 45%.

TABLE 2

|  | Ex. 5 | Com. Ex. 9 | Com. Ex. 10 |
|---|---|---|---|
| Resin Composition C | | | |
| Polyamide | | | |
| kind | NMXD6 | — | NMXD6 |
| blending amount (part by mass) | 90 | — | 85 |
| Swelled layered silicate | | | |
| kind | ORBEN | — | ORBEN |
| blending amount (part by mass) | 10 | — | 15 |
| Polyamide Resin Shaped Article | | | |
| Blending ratio | | | |
| Resin composition C (part by mass) | 10 | — | 100 |
| NMXD6 (part by mass) | 90 | — | — |

TABLE 2-continued

|  | Ex. 5 | Com. Ex. 9 | Com. Ex. 10 |
|---|---|---|---|
| Composition | | | |
| Polyamide | | | |
| kind | NMXD6 | NMXD6 | NMXD6 |
| relative viscosity | 2.7 | 2.7 | 2.7 |
| content (mass %) | 99 | 100 | 85 |
| Swelled layered silicate | | | |
| kind | ORBEN | — | ORBEN |
| content (mass %) | 1 | 0 | 15 |
| Evaluation Results | | | |
| Dispersibility (%) | 98 | — | 45 |
| Haze (%) | 3.5 | 2.6 | 18.9 |
| Oxygen permeability constant (ml/bottle · day · MPa) | 0.2 | 0.4 | 0.1 |

As described above, the polyamide resin shaped article of the present invention possesses excellent clarity, gas-barrier properties and mechanical strength and contains little gel-like particles. Therefore, the shaped article is useful as a packaging material for foods, beverages, medicines, electric parts, etc.

What is claimed is:

1. A polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-chain, aliphatic α,ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, wherein the polyamide resin shaped article is produced by:
   preliminarily melt-kneading 70 to 95 mass % of the polyamide resin A and 30 to 5 mass % of the silicate B, on the basis of a sum of the polyamide resin A and the silicate B, to prepare a resin composition C;
   melt-kneading 3 to 40 mass % of the resin composition C and 97 to 60 mass % of the polyamide resin A, on the basis of a sum of the resin composition C and the polyamide resin A, at the time of producing the polyamide resin shaped article; and then
   shaping or molding the melt-kneaded product into the polyamide resin shaped article in which the silicate B is uniformly and finely dispersed throughout the polyamide resin A.

2. The polyamide resin shaped article according to claim 1, wherein a relative viscosity of the polyamide resin shaped article is 2.45 to 3.85 when measured at 25° C. on a 1 g/dl solution in a 96% aqueous solution of sulfuric acid.

3. The polyamide resin shaped article according to claim 1, wherein the silicate B is at least one mineral treated with the organic swelling agent, the mineral being selected from the group consisting of kaolinite, halloysite, chrysotile, montmorillonite, hectorite, beidellite, saponite, muscovite, phlogopite, talc, pyrophyllite, vermiculite, and chlorite.

4. The polyamide resin shaped article according to claim 1, wherein the silicate B is a montmorillonite treated with the organic swelling agent.

5. The polyamide resin shaped article according to claim 1, wherein the layered silicate is treated with the organic swelling agent in an amount such that a content of the organic swelling agent in a resultant silicate B is 20 to 50 mass %.

6. The polyamide resin shaped article according to claim 1, which is made into a film.

7. The polyamide resin shaped article according to claim 6, wherein the film is a stretched film.

8. The polyamide resin shaped article according to claim 1, which is made into a hollow container.

9. A method for producing a polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-chain, aliphatic α,ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, the method comprising:

preliminarily melt-kneading 70 to 95 mass % of the polyamide resin A and 30 to 5 mass % of the silicate B, on the basis of a sum of the polyamide resin A and the silicate B, at 250 to 300° C. for a residence time of five minutes or shorter, thereby preparing a resin composition C;

melt-kneading 3 to 40 mass % of the resin composition C and 97 to 60 mass % of the polyamide resin A, on the basis of a sum of the resin composition C and the polyamide resin A, at 245 to 290° C. for a residence time of 20 minutes or shorter at the time of producing the polyamide resin shaped article; and then shaping or molding the melt-kneaded product into the polyamide resin shaped article in which the silicate B is uniformly and finely dispersed throughout the polyamide resin A.

10. The method according to claim 9, wherein the layered silicate is treated with the organic swelling agent in an amount such that a content of the organic swelling agent in the resultant silicate B is 20 to 50 mass %.

11. The polyamide resin shaped article according to claim 1, wherein the content of the silicate is 0.5 to 5 mass %.

12. The polyamide resin shaped article according to claim 1, wherein mixing ratio of polyamide resin A and silicate B in the preliminary melt-kneading is 80–93 mass % polyamide resin A to 20–7 mass % silicate B.

13. The polyamide resin shaped article according to claim 12, wherein said mixing ratio is 85–90 mass % polyamide resin A to 15–10 mass % silicate B.

14. A polyamide resin shaped article comprising (A) 92 to 99.7 mass % of a polyamide resin produced by polycondensation of a diamine component containing 70 mol % or more of m-xylylenediamine and a diacarboxylic acid component containing 70 mol % or more of a straight-claim, aliphatic α, ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, wherein the polyamide resin shaped article is produced by:

preliminarily melt-kneading 70 to 95 mass % of the polyamide resin A and 30 to 5 mass % of the silicate B, on the basis of a sum of the polyamide resin A and the silicate B, to prepare a resin composition C;

melt-kneading 3 to 40 mass % of the resin composition C and 97 to 60 mass % of the polyamide resin A, on the basis of a sum of the resin composition C and the polyamide resin A, at the time of producing the polyamide resin shaped article; and then shaping or molding the melt-kneaded product into the polyamide resin shaped article in which the silicate B is uniformly and finely dispersed throughout the polyamide resin A, wherein the resin composition C and the polyamide resin A are dry-blended prior to the melt kneading.

15. A polyamide resin shaped article comprising (A) 92 to 99.7 mass % of a polyamide resin produced by polycondensation of a diamine component containing 70 mol % of more of m-xylylenediamine and a dicarboxylic acid component containing 70 mol % or more of a straight-claim, aliphatic α, ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, wherein the polyamide resin shaped article is produced by:

preliminarily melt-kneading 70 to 95 mass % of the polyamide resin A and 30 to 5 mass % of the silicate B, on the basis of a sum of the polyamide resin A and the silicate B, to prepare a resin composition C;

melt-kneading 3 to 40 mass % of the resin composition C and 97 to 60 mass % of the polyamide resin A, on the basis of a sum of the resin composition C and the polyamide resin A, at the time of producing the polyamide resin shaped article; and then shaping or molding the melt-kneaded product into the polyamide resin shaped article in which the silicate B is uniformly and finely dispersed throughout the polyamide resin A, wherein the number of the gel-like particles having a 50 $\mu$m or more diameter in the polyamide resin shaped article is 1500 or less per $3 \times 10^{-4} m^3$.

16. A polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-claim, aliphatic α, ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, wherein the polyamide resin shaped article is produced by:

preliminarily melt-kneading 70 to 95 mass % of the polyamide resin A and 30 to 5 mass % of the silicate B, on the basis of a sum of the polyamide resin A and the silicate B, to prepare a resin composition C;

melt-kneading 3 to 40 mass % of the resin composition C and 97 to 60 mass % of the polyamide resin A, on the basis of a sum of the resin composition C and the polyamide resin A, at the time of producing the polyamide resin shaped article; and then shaping or molding the melt-kneaded product into the polyamide resin shaped article in which the silicate B is uniformly and finely dispersed throughout the polyamide resin A, wherein an oxygen permeability of the polyamide resin shaped article is 0.65 ml·mm/$m^{2 \cdot}$ day MPa or less when measured at 23° C. and 60% relative humidity.

17. A method for producing a polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-chain aliphatic α,ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, the method comprising:

preliminarily melt-kneading 70 to 95 mass % of the polyamide resin A and 30 to 5 mass % of the silicate B, on the basis of a sum of the polyamide resin A and the silicate B, at 250 to 300° for a residence time of five minutes or shorter, thereby preparing a resin composition C;

melt-kneading 3 to 40 mass % of the resin composition C and 97 to 60 mass % of the polyamide resin A, on the basis of a sum of the resin composition C and the polyamide resin A, at 245 to 290° C. for a residence time of 20 minutes or shorter at the time of producing the polyamide resin shaped article; and then shaping or molding the melt-kneaded product into the polyamide resin shaped article in which the silicate B is uniformly and finely dispersed throughout the polyamide resin A, wherein a relative viscosity of the polyamide resin shaped article is 2.45 to 3.85 when measured at 25° C. on a 1 g/dl solution in a 96% aqueous solution of sulfuric acid.

18. A method for producing a polyamide resin shaped article comprising (A) 92 to 99.7 mass % of a polyamide resin produced by polycondensation of a diamine component containing 70 mol % or more of m-xylylenediamine and a dicarboxylic acid component containing 70 mol % or more of a straight-chain aliphatic α,ω-dicarboxylic acid having 4 to 12 carbon atoms, and (B) 8 to 0.3 mass % of a silicate prepared by treating a layered silicate with an organic swelling agent with the proviso that the mass percentages are based on a sum of the polyamide resin A and the silicate B, the method comprising:

preliminarily melt-kneading 70 to 95 mass % of the polyamide resin A and 30 to 5 mass % of the silicate B, on the basis of a sum of the polyamide resin A and the silicate B, at 250 to 300° for a residence time of five minutes or shorter, thereby preparing a resin composition C;

melt-kneading 3 to 40 mass % of the resin composition C and 97 to 60 mass % of the polyamide resin A, on the basis of a sum of the resin composition C and the polyamide resin A, at 245 to 290° C. for a residence time of 20 minutes or shorter at the time of producing the polyamide resin shaped article; and then shaping or molding the melt-kneaded product into the polyamide resin shaped article in which the silicate B is uniformly and finely dispersed throughout the polyamide resin A, wherein the resin composition C and the polyamide resin A are dry-blended prior to the melt-kneading.

\* \* \* \* \*